United States Patent Office 3,726,802
Patented Apr. 10, 1973

3,726,802
LOW TEMPERATURE CHEMILUMINESCENT FORMULATIONS
Carl H. Morley and Everett M. Bens, China Lake, Calif., assignors to the United States of America as represented by the Secretary of the Navy
No Drawing. Filed July 30, 1965, Ser. No. 476,788
Int. Cl. C09k 3/00
U.S. Cl. 252—188.3    9 Claims The invention described herein may be manufactured and used by or for the Government of the United States of America for governmental purposes without the payment of any royalties thereon or therefor.

The present invention relates to a method and formulation for extending the chemiluminescence of tetrakis (dimethylamino)ethylene to temperatures below zero degrees centigrade.

The peraminoethylene, tetrakis(dimethylamino)ethylene hereinafter referred to as TMAE freezes at −5° C. and light output becomes very dim. The mixing of tetrakis (dimethylamino)ethylene (TMAE) with compounds which lower the freezing point do not significantly improve the light output. The present invention extends the luminescence of tetrakis(dimethylamino)ethylene to temperatures at least as low as −70° C.

It is therefore an object of this invention to provide a method for extending the light output of tetrakis(dimethylamino)ethylene to subzero temperatures for use in a subarctic environment.

Another object is to provide a low temperature formulation which can be used for nocturnal markers in cold climates.

Still another object is to prevent a chemiluminescent formulation which can be used to simulate biological and chemical warfare ordnance.

Other objects, features, and many of the attendant advantages of this invention will become readily appreciated as the same become better understood by reference to the following detailed description.

According to this invention the oxyluminescent compound, tetrakis(dimethylamino)ethylene (TMAE) was first mixed with a hydrocarbon in an inert atmosphere. Hexane, tetrahydrofuran, cyclooctane and a dimethylsilicone sold under the trade name SF 69 were used. To this mixture was added a member selected from the group consisting of tetramethylurea, dimethylformamide, sulfolane, 3-methylsulfolane, 2-amino-3-methylpyridine, n,n-dimethyl lactamide, diethylcyanamide, ethyleneglycoldimethylether, ethylene diamine, diethylene triamine, hexamethylenediamine, β-dimethylamino ethyl alcohol, and amine catalyzed silicone-dimethyl silicone (sold under the trade name RTV 602) or mixtures thereof. The product was stored in a suitable container and when exposed to air luminesced at temperatures as low as −70° C. A simple lightmeter was used to measure the light output in microvolts.

The following examples are presented which better illustrate the invention but should not be considered as limiting it.

EXAMPLE I

One milliliter of tetrakis(dimethylamino)ethylene (TMAE) was mixed with one milliliter of hexane and one-fourth milliliter of dimethylformamide at room temperature in an inert atmosphere. When cooled to −30° F. and exposed to air the formulation turned slightly mushy and luminesced brightly. The light did not become dim until −32° F. and was still glowing at −45° F. An addition of about one milliliter of hexane to the mushy mixture gave a dim light at −50° F.

Hexane and dimethylformamide were mixed with tetrakis(dimethylamino)ethylene (TMAE) separately to verify that both are necessary in the formulation to get the desired light response at low temperature:
TMAE+hexane, extinguished at 0° F.;
TMAE+dimethylformamide, extinguished at 18° F.
Salts such as calcium chloride and sodium perchlorate did not change the results.

EXAMPLE II

One milliliter of TMAE was mixed with one milliliter of tetrahydrofuran and about one-fourth milliliter of dimethylformamide. The formulation turned mushy and a glow extinguished at −20° F. About one milliliter of tetrahydrofuran was added to the formulation and the light extended to −30° F.

EXAMPLE III

The following three formulations gave a light output at −28° C. They consisted essentially of the following constituents:
(1) 40% by weight TMAE, 40% by weight hexane, and 20% by weight dimethylformamide. This formulation peaked at 114 microvolts and lasted for 77 minutes.
(2) 40% by weight TMAE, 40% by weight hexane, and 20% by weight sulfolane. This formulation peaked at 118 microvolts and lasted 88 minutes.
(3) 40% by weight TMAE, 40% by weight hexane, and 20% by weight 3-methylsulfolane. This formulation peaked at 230 microvolts and lasted for 230 minutes.
Note: 200 microvolts≈0.25 footlambert.

EXAMPLE IV

The following four formulations were mixed in the same manner as described in Example I, each contained 55% by weight hexane, 25% by weight TMAE and 20% by weight of the material indicated in the samples below: Light output from each sample was observed for 30 minutes at which time the test was concluded.
(1) Dimethylformamide: Output greater than 5 microvolts, maximum. Test temperature −40° C.
(2) 3-methylsulfolane: Output 32 microvolts, maximum. Temperature variation during test, −34 to −40° C.
(3) Dimethylsulfoxide: Output 760 microvolts, maximum. Test temperature −47.5° C.
(4) 2-amino-3-methylpyridine: Output greater than 3 microvolts, maximum. Test temperature −60° C.

It was found that solutions had to be premixed. If the solutions without TMAE were precooled, addition of TMAE gave almost no light output. At temperatures below −40° C. the bottom phase is solid.

EXAMPLE V

The following four formulations were prepared, each containing one milliliter of tetrakis(dimethylamino)ethylene, two milliliters of hexane and one-half milliliter of the material indicated below: (Light output was observed for 30 minutes from each sample at which time the test was concluded).
(1) Tetramethylurea: Output 24 microvolts, maximum. Temperature variation during test −41 to −46° C.
(2) Dimethylsulfoxide (precooled): Output 5 microvolts, maximum. Test temperature −59° C.
(3) N,n-dimethyl lactamide: Output 19 microvolts, maximum. Test temperature −41° C.
(4) Diethylcyanamide: Output 6.5 microvolts, maximum. Test temperature −40° C.

EXAMPLE VI

The following two formulations prepared as described herein, each contained one milliliter of tetrakis(dimethylamino)ethylene, two milliliters of hexane and one milliliter of the material indicated below: (light output from each sample was observed for 30 minutes at which time the test was concluded).

(1) Di-iso-amylamine: Output 13 microvolts, maximum. Test temperature —41° C.

(2) 3-methylsulfolane: Output 18 microvolts, maximum. Temperature variation during test, —40 to —46° C.

EXAMPLE VII

The following formulation contained 25% by weight tetrakis(dimethylamino)ethylene, 50% by weight hexane and 25% by weight of the material indicated in the samples below; all were tested at —40° C.; and light output observed for 30 minutes:

(1) 3-methylsulfolane: Glowed; the bottom phase of the sample was solid.

(2) Dimethylsulfoxide: Dimly glowed; the bottom phase of the sample was solid.

(3) 2-amino-3-methylpyridine: Dimly glowed; the sample was mushy.

(4) Tetramethylurea: Glowed; the sample was solid.

EXAMPLE VIII

One milliliter of tetrakis(dimethylamino)ethylene was mixed with one milliliter of hexane and one milliliter of ethylene glycol in an inert atmosphere at room temperature. When exposed to air at —35° C. this formulation registered one microvolt maximum on the lightmeter and extinguished in seven minutes.

A similar formulation containing one milliliter of ethyleneglycoldimethylether in lieu of the ethylene glycol registered one microvolt maximum at —35° C. and extinguished in 4 minutes.

Other samples and their results are as follows:

(1) TMAE+hexane+ethylene diamine: Output 26 microvolts. Test temperature —31° C. Duration 75 minutes.

(2) TMAE+hexane+hexamethylene diamine: Output one microvolt. Test temperature —37° C. Duration 30 minutes.

(3) TMAE+hexane+diethylene triamine: Output one microvolt. Test temperature —28° C. Duration 30 minutes.

EXAMPLE IX

One milliliter of tetrakis(dimethylamino) ethylene was mixed with two milliliters of dimethylsilicone, (sold as Viscasil 10,000) two milliliters of hexane and one-fourth milliliter of 3-methylsulfolane. This formulation luminesced at —40° C. for over 30 minutes.

EXAMPLE X

One milliliter of tetrakis(dimethylamino)ethylene was mixed with two milliliters of silicone-dimethylsilicone (RTV 602) and one-fourth milliliter of 3-methyl sulfolane. This mixture luminesced for over 30 minutes at —40° C.

EXAMPLE XI

A formulation containing 25% by weight tetrakis(dimethylamino)ethylene, 50% by weight hexane and 25% amine catalyzed silicone-dimethylsilicone, sold under the trade name RTV 602, was prepared in an inert atmosphere. It was tested at —40° C. and the light output was excellent as judged by the eye for over 30 minutes.

Additional fillers such as paraffin wax, petroleum wax (Rock Wax), and low molecular weight polyethylene did not affect the light output. They merely affect the physical properties of the formulations which may be desired for ease of dissemination.

EXAMPLE XII

A grenade was fired after cold storage at —10° F. containing a formulation comprising: 31 ml. of TMAE, 63 ml. of hexane, 6.5 ml. of 3-methylsulfolane, and 31 ml. of silicone potting compound (RTV 602). Its particles stuck to the sage bush and glowed for over 40 minutes.

EXAMPLE XIII

Another formulation using RTV 602 was prepared which had good light output at —40° C. for over 30 minutes. It consists of one milliliter of TMAE, two milliliters of cyclooctane, one milliliter of RTV 602, and 0.2 milliliter of 3-methylsulfolane.

EXAMPLE XIV

One of the best formulations is as follows: 1 ml. of tetrakis(dimethylamino)ethylene, 2 ml. of hexane, ¾ gram RTV 602, ¼ ml. of Viscasil 10,000, and ¼ ml. of 3-methylsulfolane.

This formulation polymerizes to a rubbery solid which luminescences for over 30 minutes at —40° C. It is believed that the polymer structure of this formulation is responsible for the very favorable extension of luminescence.

Viscasil 10,000 is a dimethyl silicone fluid of 10,000 centistokes viscosity which is used herein as a filler. The RTV 602 is a silicone potting compound and as used in Example X gives a good light output. The RTV 602 compound is a silicone-dimethyl silicone formulation which polymerizes with an amine type catalyst. TMAE will serve as the polymerization catalyst when present in concentrations of 25–88%.

It is apparent from the numerous examples given herein that the various compositions added to the tetrakis-(dimethylamino)ethylene-hydrocarbon solution and/or silicone solution may be used alone or in mixtures to improve chemiluminescence under subzero conditions.

Examples XII and XIV have been stored in air-proof containers and kept for long periods of time. Freezing and then thawing of the samples fails to diminish the luminescing activity of the formulations when exposed to air.

Obviously many modifications and variations of the present invention are possible in the light of the above teachings. It is therefore to be understood that within the scope of the appended claims the invention may be practiced otherwise than as specifically described.

What is claimed is:

1. A method for extending the chemiluminescence of tetrakis(dimethylamino)ethylene to subzero temperatures which comprises:
   admixing the following ingredients at room temperature in an inert atmosphere;
   about 1 ml. of tetrakis(dimethylamino)ethylene;
   about 2 ml. of a member selected from the group consisting of hexane, tetrahydrofuran, cyclooctane and mixtures thereof; and
   about 1 ml. of a member selected from the group consisting of dimethylformamide, 3-methylsulfolane, sulfolane, 2-amino-3-methylpyridine, n,n-dimethyl lactamide, diethylcyanamide, ethylene glycol dimethylether, ethylene diamine, diethylene triamine, hexamethylenediamine, β-dimethylamino ethyl alcohol, amine catalyzed silicone-dimethylsilicone and mixtures thereof.

2. A method of extending the chemiluminescence of tetrakis(dimethylamino)ethylene to subzero temperatures which comprises:
   admixing about 1 ml. of tetrakis(dimethylamino)ethylene with about 2 ml. of tetrahydrofuran and about ¼ ml. of dimethylformamide in an inert atmosphere at room temperature.

3. A method for extending the chemiluminescence of tetrakis(dimethylamino)ethylene to subzero temperatures which comprises:
   admixing about 1 ml. of tetrakis(dimethylamino)ethylene, about 2 ml. of hexane and about 1 ml. of 3-methylsulfolane in an inert atmosphere at room temperature.

4. A formulation which luminesces at subzero temperatures comprising the following ingredients:

tetrakis(dimethylamino)ethylene;
- a member selected from the group consisting of hexane, cyclooctane, tetrahydrofuran and dimethylene silicone and mixtures thereof; and
- a member selected from the group consisting of dimethylformamide, 3-methylsulfolane; sulfolane, 2-amino-3-methylpyridine, n,n-dimethyl lactamide, diethylcyanamide, ethylene glycol dimethylether, ethylene diamine, diethylene triamine, hexamethylene diamine, β-dimethylamino ethyl alcohol, amine catalyzed silicone-dimethylsilicone and mixtures thereof.

5. A formulation which luminesces at subzero temperatures comprising: tetrakis(dimethylamino)ethylene, hexane, and amine catalyzed silicone-dimethylsilicone.

6. A formulation which luminesces at subzero temperatures comprising: tetrakis(dimethylamino)ethylene, hexane, 3-methylsulfolane, dimethyl silicone fluid, and amine catalized silicone-dimethylsilicone.

7. A formulation which luminesces at subzero temperatures comprising: tetrakis(dimethylamino)ethylene, cyclooctane, and 3-methylsulfolane.

8. A formulation which luminesces at subzero temperatures comprising: tetrakis(dimethylamino)ethylene, hexane, and tetramethylurea.

9. A formulation which luminesces at subzero temperatures comprising the following:

| Ingredients: | Percent by weight |
|---|---|
| Tetrakis(dimethylamino)ethylene | 25 |
| Hexane | 55 |
| 2-amino-3-methylpyridine | 20 |

References Cited
UNITED STATES PATENTS

| | | | |
|---|---|---|---|
| 3,211,665 | 10/1965 | Allen et al. | 252—301.2 |
| 3,239,406 | 3/1966 | Coffman et al. | 252—301.2 X |
| 3,239,519 | 3/1966 | Winberg | 252—301.2 X |
| 3,264,221 | 8/1966 | Winberg | 252—301.2 X |

STEPHEN J. LECHERT, JR., Primary Examiner

U.S. Cl. X.R.

252—301.2 R